(No Model.)
G. R. & W. H. PERRY & C. K. GEORGE.
ADJUSTABLE SADDLE BAR FOR BICYCLES.
No. 475,020. Patented May 17, 1892.
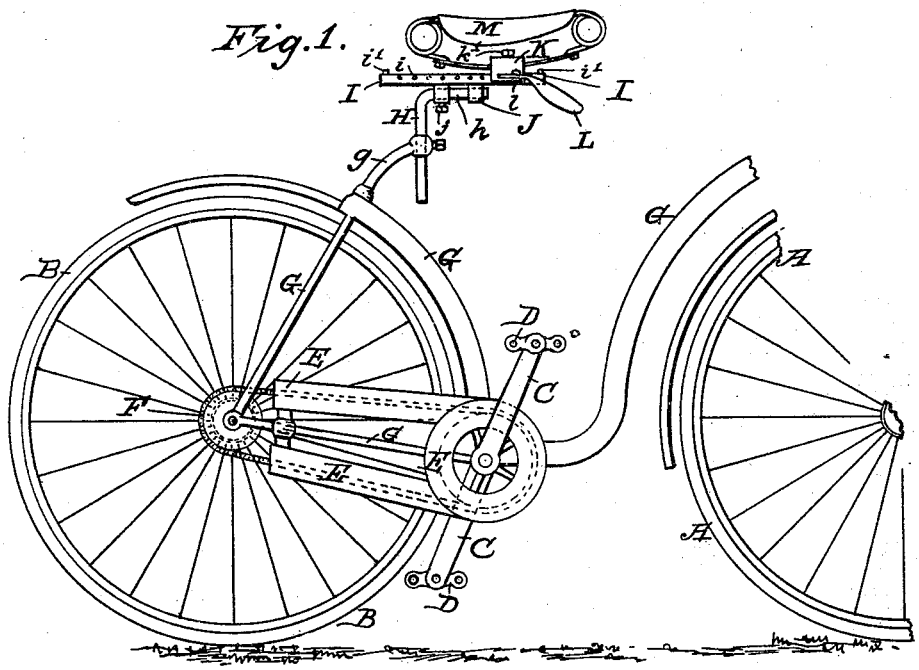
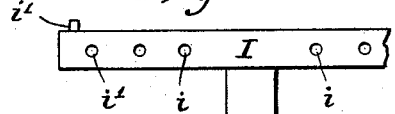
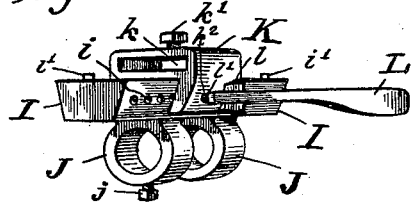
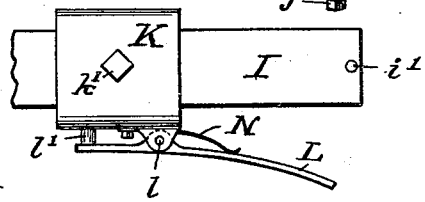
Witnesses
Inventors
G. R. Perry
W. H. Perry
By their Attorney C. K. George

UNITED STATES PATENT OFFICE.

GEORGE R. PERRY, WILLIAM H. PERRY, AND CORTIS K. GEORGE, OF CONCORD, NEW HAMPSHIRE.

ADJUSTABLE SADDLE-BAR FOR BICYCLES.

SPECIFICATION forming part of Letters Patent No. 475,020, dated May 17, 1892.

Application filed November 21, 1891. Serial No. 412,612. (No model.)

*To all whom it may concern:*

Be it known that we, GEORGE R. PERRY, WILLIAM H. PERRY, and CORTIS K. GEORGE, citizens of the United States, residing at Concord, in the county of Merrimac and State of New Hampshire, have invented a certain new and useful Improved Adjustable Saddle-Bar for Bicycles; and we do hereby declare the following to be a full, clear, and exact description of the invention, such as will enable others skilled in the art to which it appertains to make and use the same.

Our invention relates to bicycles, and has for its object to provide the same with an adjustable-seat; and it consists in the construction and combination of parts of the same, as will be hereinafter more particularly set forth.

In the accompanying drawings, Figure 1 represents a broken elevation of a bicycle in which our improvements are adapted to an ordinary saddle-bar, Fig. 2 being a detached view in perspective of that form of our device shown in Fig. 1, Fig. 3 being a broken plan view of the same; and Fig. 4 shows a modified form of our improved saddle-bar from which the adjustable slide is removed and which is adapted to be substituted for the ordinary saddle-bar.

Similar reference-letters denote corresponding parts throughout the various views.

The most important feature of our invention is the horizontal portion of the saddle-bar with its adjustable slide, said bar being adapted for attachment to an ordinary saddle-bar, or to be substituted for the latter, as will be presently explained.

A is a forward or steering wheel; B, the rear or driving wheel; C, the cranks; D, the treadles; E, the guard covering the link belt F and the forward sprocket-wheel, and G the bicycle-frame.

H represents the ordinary saddle bar or support, which is mounted in an arm $g$ and formed of round iron bent at a right angle. The horizontal portion $h$ may be placed so as to extend forward, as shown in Fig. 1, or to the rear, and upon it the ordinary saddle-clamp is adjusted by a set-screw.

I is our improved saddle-bar, which in Figs. 1 and 2 is shown as an attachment to the part $h$ of the ordinary saddle-bar H, and for that purpose is provided with perforated ears J to receive said bar $h$ and with a set-screw $j$ for securing the one part to the other; but in Fig. 4 these ears J are omitted and a bar H', preferably formed integral with the bar I, is provided, and this is used in substitution of the common saddle-bar H, being mounted in the arm $g$ in its stead. The bar I has perforations $i$ in its side and upon it is dovetailed a sliding saddle-clamp K, provided with an opening $k$, in which to mount the saddle M, secured by set-screw $k'$.

The saddle M may be readily adjusted forward or backward by a movement of the body in either direction after first bearing with one leg against a spring-actuated stop-lever L, pivoted at $l$ to said saddle-clamp K and provided at its opposite end with a pin $l'$, passing through an opening $k^2$ in said clamp K and bearing normally in one of the perforations $i$ of our improved saddle-bar I by means of a spring N. The action of the rider in pressing the lever L inward releases the pin $l'$ from said perforations $i$ and permits the adjustment of the saddle-clamp by a movement of the body in the saddle to the desired position upon the saddle-bar I, and by releasing the lever said pin $l'$ is again permitted to engage with either of the perforations $i$, and thus secure the saddle in the desired position relative to the treadles without dismounting; or the lever L may be omitted entirely, and the clamp, which is preferably formed from a single piece of metal or made rigid and disconnected, can be held upon the bar simply by frictional contact. In devices of this kind heretofore constructed special means have been found to be absolutely necessary to secure the clamp to the bar; but in our device such means may be entirely omitted or dispensed with. Suitable stops $i'$ are placed at each end of the bar I to prevent the saddle-clamp K from sliding therefrom.

Having described our invention, what we claim is—

1. The combination, with a horizontal portion of a saddle-bar the sides of which are inclined and one of them provided with perforations, of a recessed saddle-clamp formed from a single piece of material thereon, the walls of the recess being inclined to correspond with the sides of the bar, and a lever pivotally secured to the clamp, one end of which projects laterally therefrom beyond the outline of the saddle and the other end provided with a pin for engaging with the holes in the side of the saddle-bar, substantially as set forth.

2. The combination, with a saddle-bar angular in cross section and the lower side of which is provided with perforated ears, of a saddle-clamp formed from a single piece of material, the lower side of which is provided with an angular recess to fit upon the bar, and the upper portion provided with an opening for the reception of the saddle, substantially as set forth.

In testimony whereof we affix our signatures in presence of two witnesses.

GEORGE R. PERRY,
    WILLIAM H. PERRY,
    CORTIS K. GEORGE.

Witnesses:
 J. B. THURSTON,
 CARRIE E. EVANS.